(12) United States Patent
Phan et al.

(10) Patent No.: US 11,099,529 B2
(45) Date of Patent: Aug. 24, 2021

(54) PREDICTION OPTIMIZATION FOR SYSTEM LEVEL PRODUCTION CONTROL

(71) Applicant: INTERNATIONAL BUSINESS MACHINES CORPORATION, Armonk, NY (US)

(72) Inventors: Dzung Phan, Ossining, NY (US); Lam Nguyen, Ossining, NY (US); Pavankumar Murali, Ardsley, NY (US); Jayant R. Kalagnanam, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 51 days.

(21) Appl. No.: 16/519,257

(22) Filed: Jul. 23, 2019

(65) Prior Publication Data
US 2021/0026314 A1    Jan. 28, 2021

(51) Int. Cl.
*G05B 13/04* (2006.01)
*G05B 13/02* (2006.01)

(52) U.S. Cl.
CPC ....... *G05B 13/041* (2013.01); *G05B 13/0265* (2013.01)

(58) Field of Classification Search
CPC .......................... G05B 13/041; G05B 13/0265
USPC ........................................................ 700/29
See application file for complete search history.

(56) References Cited

U.S. PATENT DOCUMENTS

| | | | |
|---|---|---|---|
| 8,781,979 B2 | 7/2014 | Seo | |
| 9,329,582 B2 | 5/2016 | Boe | |
| 9,978,017 B1 | 5/2018 | Simms | |
| 10,197,632 B2 | 2/2019 | Wenzel | |
| 2011/0125461 A1* | 5/2011 | Smith | G05B 23/0254 702/179 |
| 2012/0078678 A1* | 3/2012 | Pradhan | G06Q 10/0633 705/7.27 |

(Continued)

OTHER PUBLICATIONS

"Acyclic Graph & Directed Acyclic Graph: Definition, Examples, statisticshowto.com/directed-acyclic-graph/, Apr. 6, 2016" (Year: 2016).*

(Continued)

*Primary Examiner* — Santosh R Poudel
(74) *Attorney, Agent, or Firm* — Cantor Colburn LLP; Joseph Petrokaitis (57) ABSTRACT

A computer-implemented method for controlling a production system includes mapping, by a controller, the production system as a directed acyclic graph. The production system can include multiple plants that are represented as nodes and relations between the plants represented by edges of the directed acyclic graph. The method further includes generating, by the controller, a regression model for each of the plants in the production system. The method further includes predicting, by the controller, an output of each plant based on sensor data associated from each plant. The method further includes adjusting, by the controller, one or more control variables for each plant based on a target output by using machine learning. The method further includes adjusting, by the controller, the one or more control variables for each plant to generate the target output.

14 Claims, 8 Drawing Sheets

(56) References Cited

U.S. PATENT DOCUMENTS

| | | | |
|---|---|---|---|
| 2015/0355650 A1* | 12/2015 | Friedrich | G06Q 10/0631 |
| | | | 700/276 |
| 2016/0071017 A1 | 3/2016 | Adjaoute | |
| 2016/0195865 A1* | 7/2016 | Shiel | G05B 19/042 |
| | | | 700/276 |
| 2016/0225262 A1* | 8/2016 | Edakunni | G06Q 10/04 |
| 2017/0104343 A1 | 4/2017 | Elbsat | |
| 2018/0053328 A1* | 2/2018 | Simonovic | G06F 8/433 |
| 2018/0075549 A1 | 3/2018 | Turney | |
| 2019/0041811 A1 | 2/2019 | Drees | |
| 2019/0072947 A1 | 3/2019 | Park | |
| 2019/0073609 A1 | 3/2019 | Hollender | |
| 2019/0129769 A1* | 5/2019 | Frech | G06F 8/36 |
| 2019/0137979 A1* | 5/2019 | Akella | G06F 11/079 |
| 2019/0146423 A1 | 5/2019 | Salsbury | |
| 2020/0210532 A1* | 7/2020 | Matei | G06F 30/373 |

OTHER PUBLICATIONS

Ferramosca et al.; "Cooperative Distributed MPC for Tracking", Elsevier, Automatica 49, 2013. pp. 906-914.

Kogel et al.; "Set-Point Tracking using Distributed MPC", 10th IFAC International Symposium on Dynamics and Control of Process Systems (DYCOPS), Dec. 18-20, 2013. pp. 57-62.

Vega et al.; "Integration of Set Point Optimization Techniques Into Nonlinear MPC for Improving the Operation of WWTPs", Computers & Chemical Engineering, DOI: 10.1016/J.COMPCHEMENG. 2014.03.027. Sep. 2014. 30 pages.

Wang et al.; "Model Predictive Control With Learning-Type Set-Point: Application to Artificial Pancreatic β-Cell", AIChE Journal, Vo. 56, No. 6, Jun. 2010. pp. 1510-1519.

\* cited by examiner

PREDICTION OPTIMIZATION FOR SYSTEM LEVEL PRODUCTION CONTROL

BACKGROUND

The present invention generally relates to using machine learning to operate a control system that manages operations of a system that includes multiple plants, and more specifically, to a framework to maximize the prediction output over different possible options on control variables, where a relationship in each plant is captured via machine learning.

Heavy industries, such as large manufacturing and industrial companies have been, and continuously are, transforming to a digital semantic representation of a manufacturing or a processing plant. This representation is continuously replenished with real-time measurements from sensor networks using high bandwidth, low cost networks (publicly available) to provide up-to-date situational awareness of the operational efficiency and yield of an enterprise and its effect on the demand-supply dynamics on the manufacturing ecosystem. This data rich representation coupled with context-specific predictive analytics enable enterprises to anticipate disruptions, impact on productivity, yield and to take proactive corrective measures to optimize industrial operations.

SUMMARY

According to one or more embodiments of the present invention, a computer-implemented method for controlling a production system includes mapping, by a controller, the production system as a directed acyclic graph. The production system can include multiple plants that are represented as nodes and relations between the plants represented by edges of the directed acyclic graph. The method further includes generating, by the controller, a regression model for each of the plants in the production system. The method further includes predicting, by the controller, an output of each plant based on sensor data associated from each plant. The method further includes adjusting, by the controller, one or more control variables for each plant based on a target output by using machine learning. The method further includes adjusting, by the controller, the one or more control variables for each plant to generate the target output.

According to one or more embodiments of the present invention, a system includes multiple plants that form a production system, and a controller coupled with the plants for controlling the production system by performing a method. The method for controlling the production system includes mapping, by the controller, the production system as a directed acyclic graph. The production system can include multiple plants that are represented as nodes and relations between the plants represented by edges of the directed acyclic graph. The method further includes generating, by the controller, a regression model for each of the plants in the production system. The method further includes predicting, by the controller, an output of each plant based on sensor data associated from each plant. The method further includes adjusting, by the controller, one or more control variables for each plant based on a target output by using machine learning. The method further includes adjusting, by the controller, the one or more control variables for each plant to generate the target output.

According to one or more embodiments of the present invention, a computer program product includes a computer readable memory that has computer executable instructions stored thereupon. The computer executable instructions when executed by a processor cause the processor to perform a method for controlling a production system. The method includes mapping, by a controller, the production system as a directed acyclic graph. The production system can include multiple plants that are represented as nodes and relations between the plants represented by edges of the directed acyclic graph. The method further includes generating, by the controller, a regression model for each of the plants in the production system. The method further includes predicting, by the controller, an output of each plant based on sensor data associated from each plant. The method further includes adjusting, by the controller, one or more control variables for each plant based on a target output by using machine learning. The method further includes adjusting, by the controller, the one or more control variables for each plant to generate the target output.

The above-described features can also be provided at least by a system, a computer program product, and a machine, among other types of implementations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Emergence of artificial intelligence (AI) based cognitive systems have led to development of cognitive advisor systems that can be built for each enterprise function. For example, a cognitive plant advisor can be designed to consume historical and real-time data to predict process performance/health and support a plant manager, that may be a human user. The cognitive plant advisor can (i) manage set points for control over time horizons of days (advisory control), and (ii) provide the health score for each process/asset and provide a rank ordering of importance for mitigation.

In the existing solutions, this entails developing a machine learning model for each plant or process in the system that is to be managed by the cognitive advisor system. The generated model has to accurately capture the underlying physical relationships, in lieu of first-principles based models that are often unavailable or intractable. Typically, the model that is built using historical data assimilates real-time measurements and hence provides high local temporal fidelity and tracks any non-stationarity in the plant. Using the cognitive advisor system also requires developing a set-point optimization model that offers the flexibility of dynamically introducing operational restrictions as and when they arise. The optimization model has to be lightweight yet scalable to provide set-point recommendations in near real-time. Because the optimization uses a data driven regression model as a representation of each plant, its run-time complexity, scalability and solution quality guarantees depend on the nature of the model, e.g. whether a piece-wise linear model is used, nonlinear and non-convex deep neural network is used, or a non-continuous ensemble model is used.

With each plant having its own model and corresponding control variables, a technical problem that arises is that of optimizing and adjusting the prediction outputs (such as productivity and efficiency) of a system that includes multiple such plants. Particularly, the technical problem can arise in case of a large system, including a number of sub-systems/plants (e.g. more than 5 plants), with different possible options on control variables over a long-time horizon (e.g. more than 3 months). The relationship between inputs and an output in each of these subsystems is based on a respective regression model. One or more embodiments of the present invention address such technical problem by providing a prediction-optimization framework combining regression analysis and nonlinear programming.

Throughout the present description, for explanation of the features, a real world application from the oil sands production industry is used as an example. It is understood that the features and embodiments of the present invention are not limited to that example and are applicable to any other field.

Figure 1:
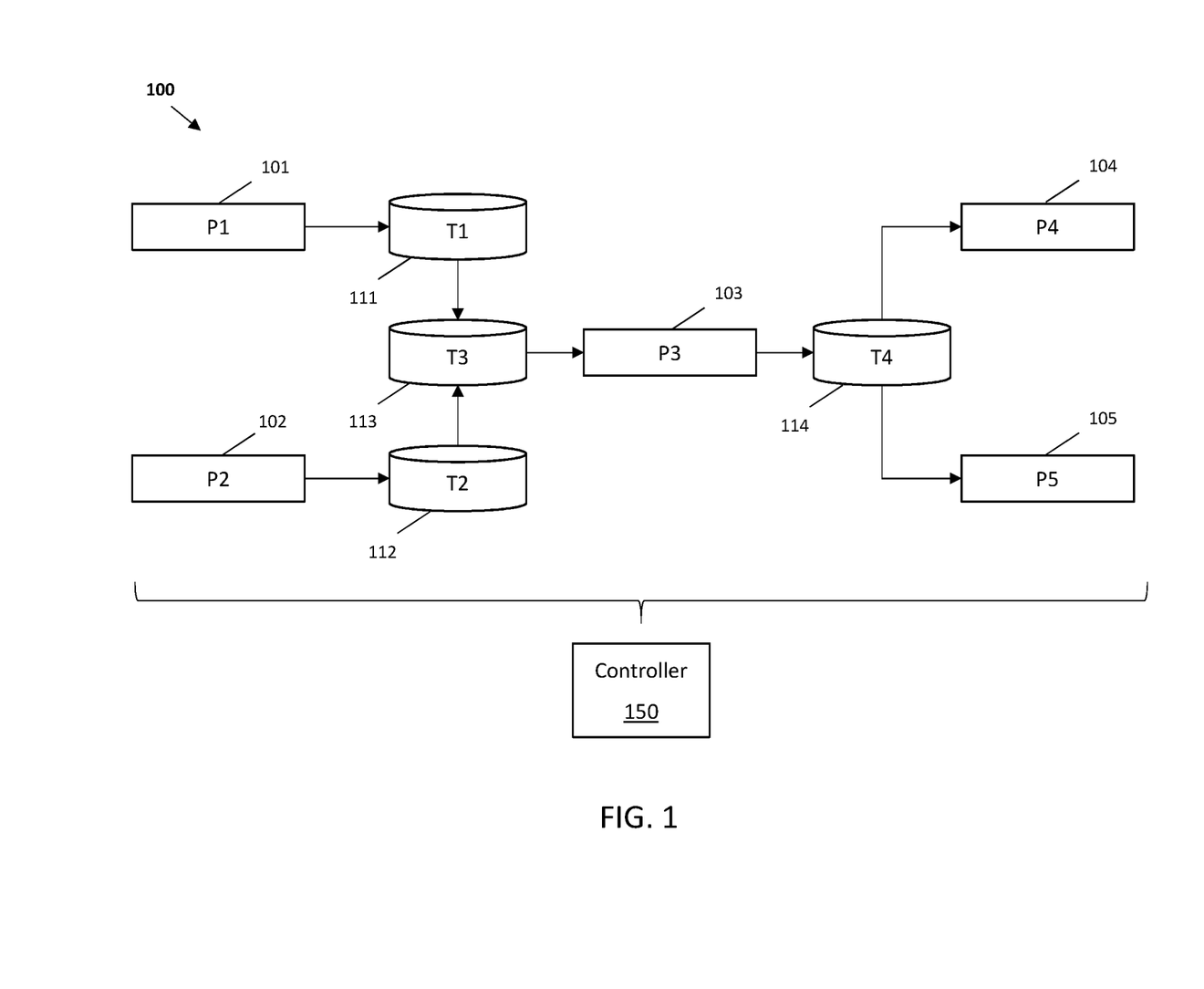
FIG. 1 depicts a block diagram of an example oil sands production industry scenario used to explain one or more embodiments of the present invention.

FIG. 1 depicts a block diagram of an example oil sands production industry scenario used to explain one or more embodiments of the present invention. For the oil sands production industry 100 depicted, at least in this context, the optimization involves devising production strategies that maximize Synthetic Crude Oil (SCO) production, under both normal operations as well as unplanned upsets and breakdowns. Starting with mined oil sands, the first step is to extract bitumen as froth (at plants P1 101 and P2 102) and store it in a storage tank (T1 111 and T2 112). Plants P1 101 and P2 102 denote two parallel froth and diluted bitumen production plants. The storage tanks T1 111 and T2 112 denote intermediate storage tanks and the storage tank T3 113 stores diluted bitumen from both, T1 111 and T2 112.

Diluted bitumen is then passed through an upgrading plant, P3 103, to produce low-quality SCO that gets stored in storage tank T4 114. This is an intermediate product that is either sold directly to refineries or is further processed in plants P4 104 and P5 105 that denote parallel upgraders that produce different grades of SCO.

The system 100 includes a network of the multiple plants. Each plant has a self-contained set of inputs and outputs. The outflow from an upstream process becomes an inflow into a downstream process. Accordingly, a complex relationship exists between the various set-points, material inflows, and the final throughput of the system 100. The final throughput is the output of P4 104 and P5 105, together, in one or more embodiments of the present invention. The production plan for the system 100 has to be dynamic due to events like scheduled maintenance, unexpected breakdowns, or shifting economic objectives under which the system 100 is operated.

According to one or more embodiments of the present invention, the system 100 is controlled by a controller 150 by configuring one or more control variables in the various plants. The controller 150 can be a computer, such as a server computer, a tablet computer, a laptop computer, a desktop computer, or any other type of computing device.

The controller 150 can access historical data of the one or more plants in the system 100. For example, the historical data can cover a span of three years or more. The historical data contains sensors measurements and production outputs for each plant in the system 100. Under such scenarios, the controller 150 generates an optimization model for the system 100. The optimization model can provide a set of recommendations on control set-points for the plant manager, such as mine tonnage rates and upgrading feed rates, that optimize the SCO production while maintaining the levels of intermediate products in storage tanks and some operational constraints.

The optimization model is to optimize the system 100 at a site-wide level spanning the multiple plants and processes. The existing solutions have typically tried to address the technical problem of such optimization by using nonlinear models based on physical principles (e.g., thermodynamics) for each process and coupling these models via flow and material balance equations. Alternatively, or in addition, other existing solutions attempt to combine physical models and data-driven models.

According to one or more embodiments of the present invention, the optimization model addresses the system-wide prediction optimization problem for a production plant, such as the system 100. According to one or more embodiments of the present invention, the optimization model is devoted to maximizing the flow throughput of end products by seeking an optimal production schedule over a specified time horizon with operational constraints (e.g., storage inventories and economic targets). The use of machine learning to model complex process (production or enterprise) from data facilitates to improve operations measure in terms of productivity, throughput, efficiency and/or resource utilization. In such a setting the pipelines for analysis include a machine learning step to build prediction models for every output followed by an optimization procedure to derive the optimal set points for the entire process (and not just individual subsystems). Accordingly, one or more embodiments of the present invention facilitate techniques to model and optimize unit operations for system-wide process to maximize the output of the system 100 by generating set-point recommendations for each subsystem in the system 100. The subsystems can include the plants (P1-P5) and/or the storage tanks (T1-T4). Advantages provided by one or more embodiments of the present invention include providing the ability to act on events in near-real time across the entire system 100 for enterprise operations management.

Accordingly, one or more embodiments of the present invention provide improvements over existing solutions in which AI is used in a limited manner to devise an optimal operational plan and to identify potential failure events. For example, in existing solutions, plant managers use a heuristic-based approach based on years of experience to identify set points at unit process level, or at design time. Further, fixed rules-of-thumb values are used to decide if observed behavior in one part of the system 100 may be indicative of an impending failure in another part of the system 100, or the overall system 100. Embodiments of the present invention facilitate a continuous process that monitors data such as sensor data for the one or more components of the system 100 and provides notifications, adjustments, and other such information to the plant managers dynamically. Further, the use of machine learning/deep learning models accurately capture the underlying physical relationships and non-stationarity in the entire process.

Also, as will be described further, one or more embodiments of the present invention facilitate a multi-time period set-point optimization model that offers the flexibility of dynamically introducing operational restrictions. Such flexible optimization approaches can take in regression functions without derivative information, such as random forests, and those with derivatives, such as neural networks. Accordingly, one or more embodiments of the present invention provide separate optimization models—one for gradient-based and one for derivative-free models. Using such techniques, one or more embodiments of the present invention facilitate receiving and analyzing sensor data from the system 100 and determining optimal control variable values for the various plants in near-real time across the entire system 100.

Figure 2:
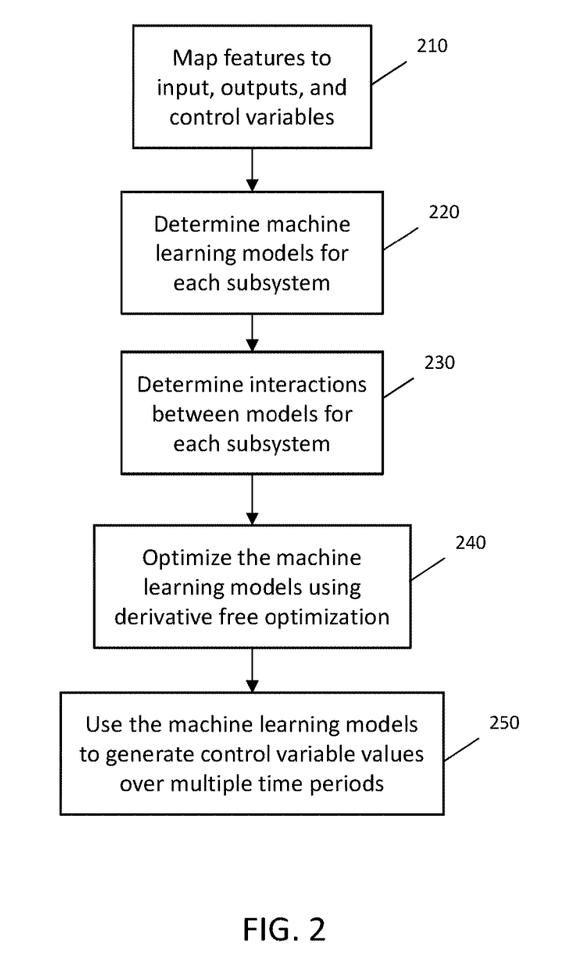
FIG. 2 depicts a flowchart of a method for optimizing and adjusting system wide operations according to one or more embodiments of the present invention.

FIG. 2 depicts a flowchart of a method for optimizing and adjusting system wide operations according to one or more embodiments of the present invention. The method includes mapping features to inputs, outputs, and control variables of a plant in the system 100, at block 210. The mapping includes representing the process/system 100 as a directed acyclic graph (as shown in FIG. 1) that can be input to the controller 150 in a digital format. This can include identifying one or more subsystems in the system 100. Mapping features further includes, given raw sensor data for all processes, identifying which features are inputs of a process, what columns represent values for the output etc. In one or more examples, a user can provide the mapping via a user interface, via an electronic data file that includes the mapping, and any other such manner.

The mapping further includes extracting relevant data from the historical data of the system 100, which includes the inputs, outputs, and control variables of each plant in the system 100 over at least a predetermined duration. The extracted data can then be aggregated, such as by computing one or more statistical values, for example, mean, geometric mean, standard deviation, and the like.

Further, the method includes determining machine learning models for each subsystem in the system 100, at block 620. For example, the subsystems can include the plants (P1-P5) and/or the storage tanks (T1-T4) that have one or more control variables that can be adjusted to impact the final output of the system 100. In one or more embodiments of the present invention, machine learning is used to build a regression model for each respective subsystem to capture the relationship between the outflow, control set-points, and inflow rates from upstream subsystems. As an example, the SCO from plant P3 103 in FIG. 1 can be modeled as a function of the flow rate from tank T3 113 and non-flow variables (e.g., temperature, density, pressure, or composition ratio).

Figure 3:
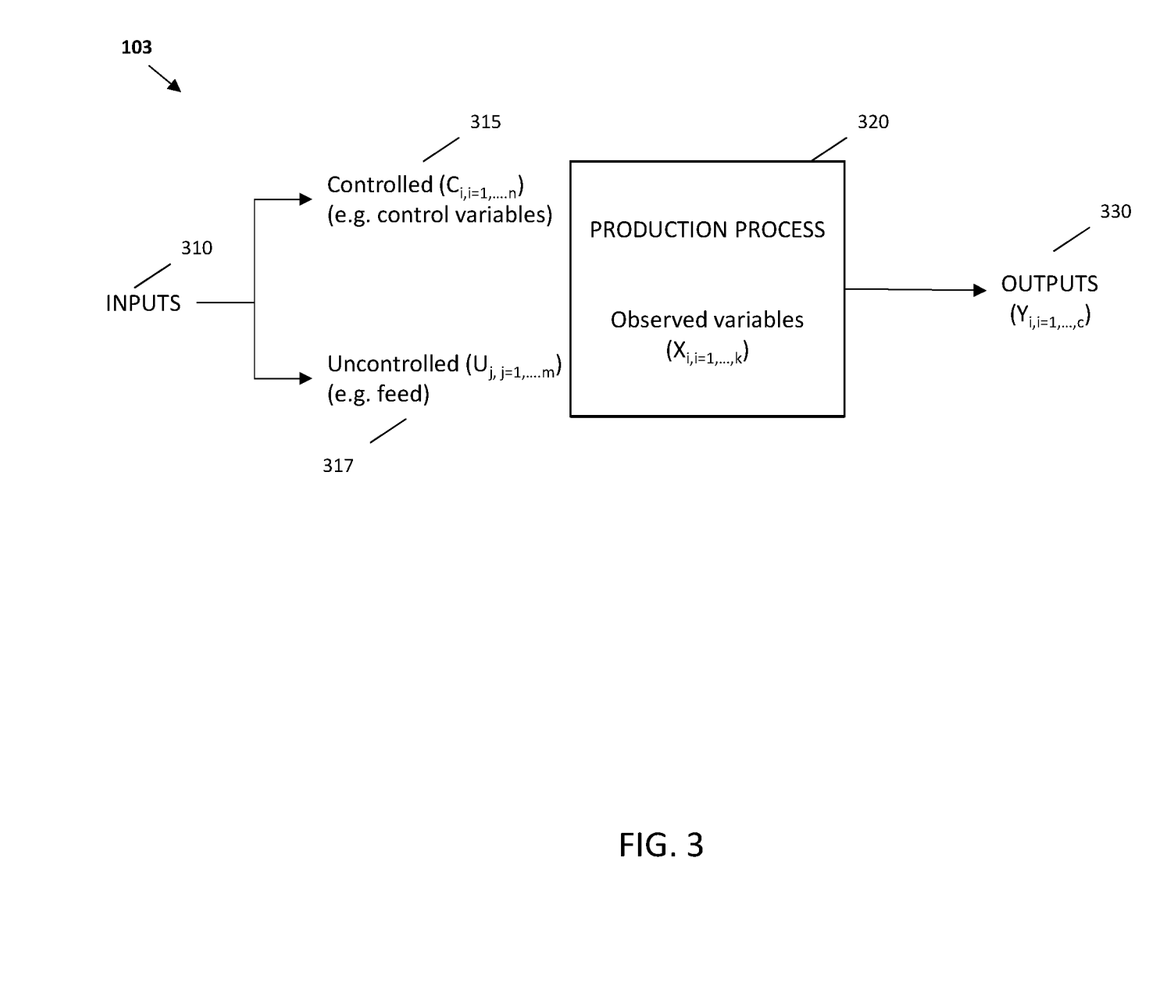
FIG. 3 depicts a visual depiction of a plant as a model according to one or more embodiments of the invention.

FIG. 3 depicts a visual depiction of the plant P3 103 as a model according to one or more embodiments. It is understood that this is one possible example, and that in other embodiments of the present invention, the model can include different parameters. The production process 320 of the plant P3 is modeled as a collection of variables ($X_i$) that cause inputs 310 to result in the outputs 330. The $X_i$ is a result of determining a regression function representing the process performed by the plant P3 103, in this case. The inputs 310 can include control variables ($C_i$) 315 that are used to configure the plant P3 103 as well as other input variables that are not controlled by the controller 150. For example, such uncontrolled variables ($U_j$) 317 can include amount of feed. It is understood that the representation of the subsystem can be different than the depiction in FIG. 3 in other embodiments of the invention and/or depending on the system 100 being modeled. It should be noted that X, U, C, and Y are vectors of values.

The system 100, especially when it is an engineered one, operates in a steady state mode. A "steady state mode" can be defined as a state when the system 100 has equilibrated (in a temporal sense) and the rate of change of the state variables is zero. In practice, a complex nonlinear dynamical system, such as the system 100, can have multiple steady states and operationally the system 100 might be operated around a few of these steady state points (also called operating modes). For example, industrial plants often operate at different levels of throughput due to preventive maintenance or economic reasons.

One or more embodiments of the present invention facilitate two types of analysis for steady state systems: (i) Monitoring the behavior of the system around a stationary point, and (ii) Identifying the multiple stationary points from data so as to monitor the system 100 against the correct stationary operating point.

The controller 150, when generating the optimization model, considers that transient changes in the control variables happen much slower than the time scale of optimization and only one operating mode is used for the entire time period. Hence, a static steady-state model is used for each plant at each time period, which corresponds to an operating mode. Accordingly, in one or more embodiments of the present invention, the method includes building regression models that provide a functional relation between the targets against the inputs. The choice of regression functions can be diverse including linear regression, non-smooth models (e.g., decision tree), highly nonlinear and complex neural networks, and black-box models (e.g., random forests).

The method further includes determining interactions between each subsystem in the system 100 when they operate at a stationary point, at block 230. In one or more examples, this can performed by determining interactions between the corresponding models of the subsystems. According to one or more embodiments, the system 100 is modeled as one or more process flows of the plants as a directed multi-layer network of subsystems.

Figure 4:
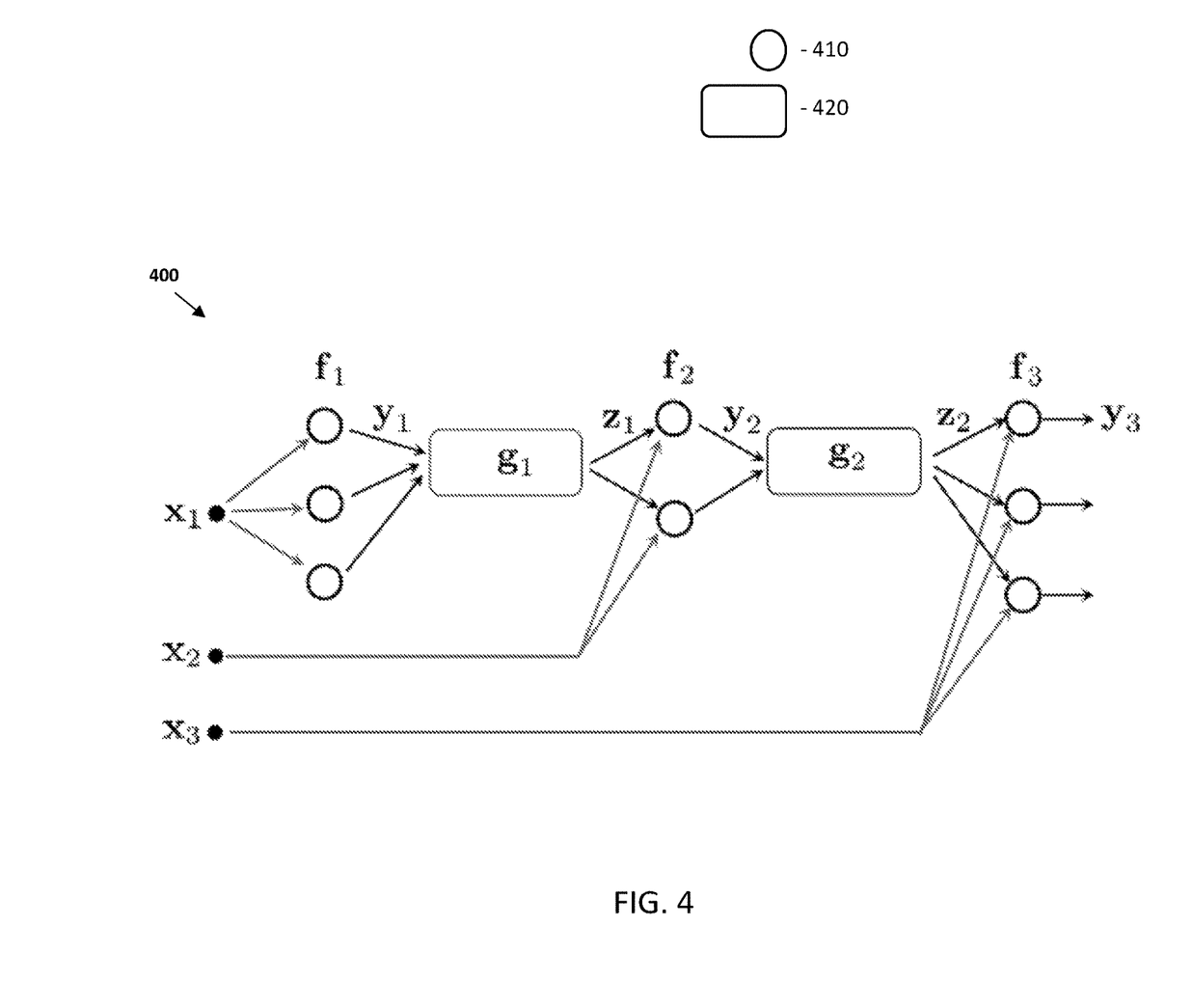
FIG. 4 depicts an example network representation for the system shown in FIG. 1 according to one or more embodiments of the invention.

FIG. 4 depicts an example network representation for the system 100 from FIG. 1 according to one or more embodiments. The network representation 400 that is depicted visualizes the system 100 as a hierarchy structure with L layers having upstream-downstream operation relations. Each of the layers can be implemented as a layer in a machine learning algorithm, such as an artificial neural network (ANN), for example, a deep neural network (DNN), a convolutional neural network (CNN), or the like.

In FIG. 4, a circular node (410) in a layer of the network represents a plant (i.e., a subsystem), where a regression function ($f_l$) is to be built. A rectangular node (420) represents all operational constraints such as maintaining inventory levels and limits on the adjustment of control variables from the preceding time period. The relationship in these rectangular nodes are linear.

The vector-valued regression function for each of the subsystems is determined using techniques that are known in the art. For example, the regression function for a plant in the lth layer that is determined from the historical data can be expressed as—

$$f_l:(z_{l-1},x_l)\in R^{k_{l-1}+m_l}\to y_l\in R^{n_l}$$

Here, $x_l \in R^{m_l}$ and $z_{l-1} \in R^{k_{l-1}}$ denote the controllable variables (e.g., set points) 315 and uncontrollable variables (e.g., the inflow from the previous process) 317 for $f_l$. The vector $y_l \in R^{m_l}$ denotes the outputs. Here the assumption is that $k_0=0$; that is, the decision variables for the first layer of the ANN are only set points. Now, if Ø represents the objective function for the system 100, the main goal is to find optimal set points $x_l$ and flow rates ($y_l$, $z_l$) to maximize production or some target variable. A single-period problem can be written as the following constrained optimization problem:

$$\left.\begin{array}{r}\min_X \emptyset(y_l) \text{ such that:} \\ y_1 = f_1(x_1) \\ y_l = f_l(z_{l-1}, x_l), \forall\, l = 2, \ldots, L, \\ A_l y_l + B_l z_l \le b_l, \forall\, l = 1, \ldots, L-1, \\ \underline{x}_l \le x_l \le \overline{x}_l, \forall\, l = 1, \ldots, L,\end{array}\right\} \quad (1)$$

where $X=(x_1, \ldots x_L, \ldots, y_1, \ldots, y_L, \ldots, z_1, \ldots, z_L)$, and the objective function $\emptyset(y_l)$ depends on the output at the last layer. In the above $f_l$ represent the regression functions that model each of the subsystems in the system 100; x are primary control variables (e.g. for the plants P1-P5); z are secondary control variables (e.g. for the storage tanks T1-T4); and y are the state variables.

Here, $\underline{x}_l$ and $\overline{x}_l$ are defined as upper and lower bounds on the primary control variables. The regression model is cognizant of operational domain constraints. Model parameter matrices $A_l$ and $B_l$ and vector $b_l$ are used to capture interactions between nodes within two consecutive layers. One example for operational constraints to be included in $A_l y_l + B_l Z_l \le b_l$ is the tank storage constraint for tank T3 113 in the system 100 of FIG. 1.

Further, one or more embodiments of the present invention facilitate maximizing the output of the system 100 over T time periods with coupling constraints between periods. The problem of a single time period, described by the equation (1) is a special case of the multiple time periods. Two operational constraints and the time index $t \in \{1, \ldots, T\}$ to denote the t-th time period.

For some controllable variables, between two consecutive periods, an amount of adjustment has to be limited. The ramp-up/down rate limits are modeled as:

$$|x_l^t - x_l^{t+1}| \le \rho_l \odot x_l^t, \quad (2)$$

for some $\rho_l \in [0,1]$ and $l=1, \ldots, L$, $t=\ldots, T$. Here, $\odot$ denotes the component-wise product.

Further, consider that $u_l^t$ denote the storage tank levels at time t for the l-th layer. For inventory capacity constraints:

$$\underline{u}_l \leq u_l^t \leq \bar{u}_l$$

$$u_l^t = u_l^t + y_l^t - z_l^t \quad (3)$$

$$|u_l^t - u_l^{t-1}| \leq \alpha_l \odot u_l^{t-1},$$

for some $\alpha_l \in [0,1]$, where $\underline{u}_l$ and $\bar{u}_l$ are tank storage limits.

Accordingly, a multi-period formulation can be written as follows:

$$\min_{x^t, u_l^t} \sum_{t=1}^{T} \phi^t(y_L^t) \text{ such that:} \quad (4)$$

$$x^t \in X^t,$$

$$(x_l^t, u_l^t) \text{ satisfy (2) and (3)}$$

$$(l = 1, \ldots, L, t = 1, \ldots, T),$$

where, $X^t$ is the set of constraints for the t-th period having a form of (1). Here, $x^0$ and $u^0$ are provided from present operation time. This the production plant optimization problem for a long planning horizon, expressed in (4) is a large scale, and nonlinear problem. However, it is tractable and can be solved efficiently because it enjoys a decomposable structure.

Accordingly, (1) and (4) above provide mathematical representation of the single period and multi-period optimization problem that is solved by one or more embodiments of the present invention using machine learning, such as ANN. A technical challenge to optimize regression based functions, such as those in (1) and (4) is that the underlying machine learning techniques provide only implicitly specified or complicated functions.

Typically, in machine learning, ensemble methods are used, where an ensemble method is a machine learning technique that combines several base models in order to produce one optimal predictive model. For example, an ensemble method such as Random Forests or xgBoost is an ensemble of trees. The prediction output in these cases is a function of predictor variables, which need to be treated as a black box. The function evaluation is generally costly (with respect to time and computer resources) or noisy, and derivative information is unavailable, unreliable, or impractical to obtain. For deep learning, a deep neural network with many layers is a composition of nonlinear transformation functions. The full derivative with respect to input controls for the fixed, optimized set of weights can also be expensive to evaluate, because it requires a backpropagation and a full pass of substantially large dataset. Another technical challenge with ensemble methods is the notorious "vanishing gradient issue" when using gradient information to optimize the process. In machine learning, the vanishing gradient problem is a difficulty found in training artificial neural networks with gradient-based learning methods and backpropagation. In such methods, each of the neural network's weights receives an update proportional to the partial derivative of the error function with respect to the current weight in each iteration of training. The problem is that in some cases, the gradient is substantially small and hence "vanishing", effectively preventing the weight from changing its value.

To address such technical challenges, one or more embodiments of the present invention facilitate gradient-based algorithms for these problems where the gradient for each regression function is evaluated independently. The techniques according to one or more embodiments of the present invention are based on and improve upon alternating direction method of multipliers (ADMM). Further, according to one or more embodiments of the present invention a derivative free optimization algorithm is used to handle black-box functions.

For the single period model, reformulating the linear inequalities in (1) into equalities, and separating out the box constraints provides the following problem description:

$$\min_{w} \phi(y_L) \text{ such that:} \quad (5)$$

$$y_1 = f_1(x_1),$$

$$y_l = f_l(z_{l-1}, x_l), \forall l = 2, \ldots, L,$$

$$A_l y_l + B_l z_l + v_l b_l = 0, \forall l = 1, \ldots, L-1,$$

$$\underline{x}_l \leq x_l \leq \bar{x}_l, \forall l = 1, \ldots, L,$$

$$\underline{y}_l \leq y_l \leq \bar{y}_l, \forall l = 1, \ldots, L,$$

$$\underline{z}_l \leq z_l \leq \bar{z}_l, \forall l = 1, \ldots, L-1,$$

$$v_l \geq 0, \forall l = 1, \ldots, L-1, \text{ where}$$

$$W = (x_1, \ldots, v_{L-1})$$

In order to solve problem (5), the Lagrangian is defined as:

$$\mathcal{L}(\hat{x}, \hat{y}, \hat{z}, \hat{v}, \hat{\lambda}, \hat{\mu}; \beta, \rho) =$$

$$\phi(y_L) + \lambda_1^T(y_1 - f_1(x_1)) + \sum_{i=1}^{T} \lambda_i^T(y_l - f_l(z_{l-1}, x_l)) +$$

$$\sum_{l=1}^{L-1} \mu_l^T(A_l y_l + B_l z_l + v_l - b_l) + \frac{\beta}{2}\|y_1 - f_1(x_1)\|^2 +$$

$$\frac{\beta}{2}\sum_{l=2}^{L}\|y_l - f_l(z_{l-1}, x_l)\|^2 + \frac{\rho}{2}\sum_{l=1}^{L-1}\|A_l y_l + B_l z_l + v_l - b_l\|^2,$$

Where $\hat{x}=(x_1, \ldots, x_L)$, $\hat{y}=(y_1, \ldots, y_L)$, $\hat{z}=(z_1, \ldots, z_{L-1})$, $\hat{v}=(v_1, \ldots, v_{L-1})$, $\hat{\lambda}=(\lambda_1, \ldots, \lambda_L)$, $\hat{\mu}=(\mu_1, \ldots, \mu_{L-1})$, and $\beta, \rho$ are positive constants. Here, L is the number of layers in an ANN used to optimize the model. An alternating optimization framework for minimizing the Lagrangian is then used. The primal-dual algorithm for (5) minimizes over $\hat{x}, \hat{y}, \hat{z}, \hat{v}, \hat{\lambda}, \hat{\mu}$ separately and is described further. Here, A, B, and b are used to model a graphical representation of a plant. X, Y, Z are decision variables as described herein, and the remaining are additional variables, that are used to solve problem (5).

Figure 5:
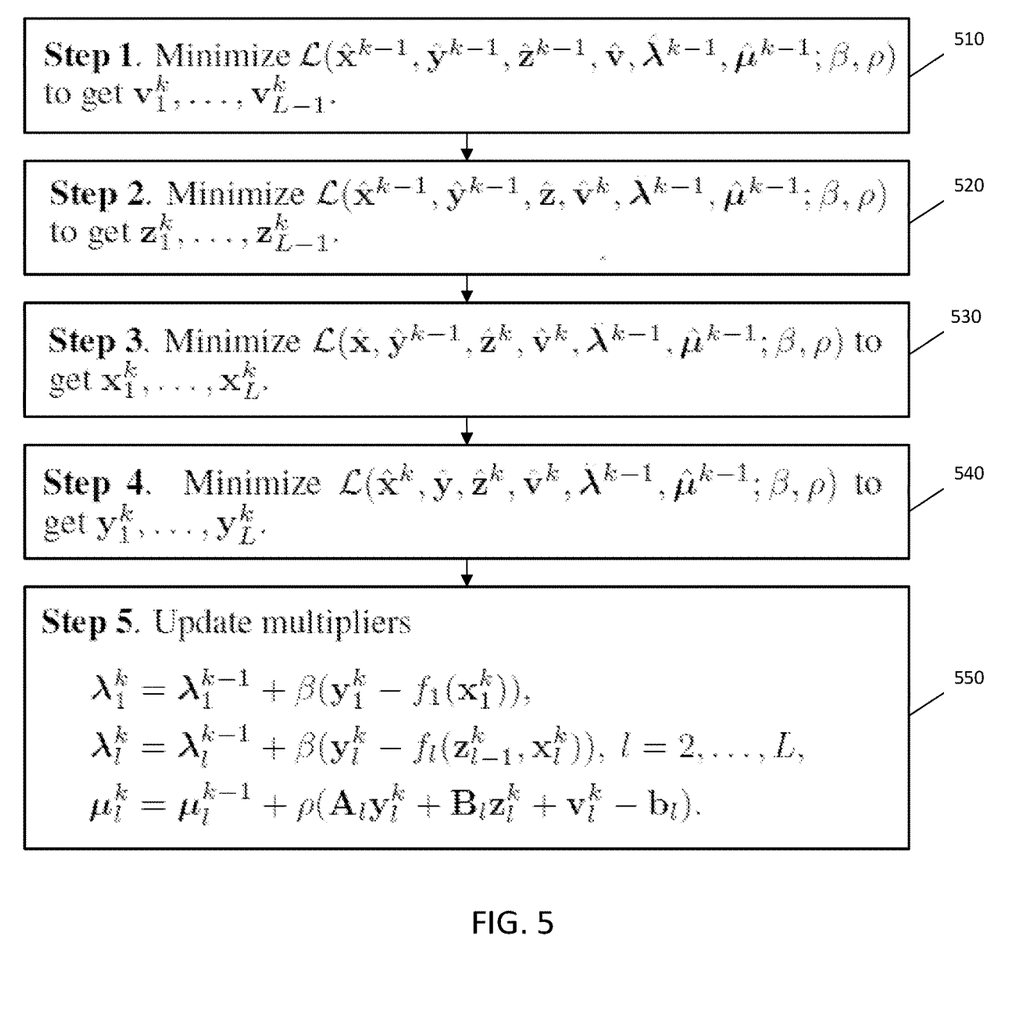
FIG. 5 depicts a flowchart of a method for implementing an optimization of the model of the entire system for a single time period according to one or more embodiments of the present invention.

FIG. 5 depicts a flowchart of a method for implementing an optimization of the model of the entire system for a single time period according to one or more embodiments of the present invention. The method facilitates to linearize the regression function $f_l$. For a vector $\alpha$, lower and upper bounds l and u, $P(\alpha, l, u)$ denotes the projection $\min\{\max\{a, l\}, u\}$. In the method, the Lagrangian is minimized for different values at different steps. For example, at step 1 in block 510, the Lagrangian is minimized to obtain $v_1^k, \ldots, v_{L-1}^k$. Further, in block 520, the minimization is performed to obtain $z_1^k, \ldots, z_{L-1}^k$. This step can be performed by casting the minimization problem in this step as a linear problem as follows:

$$\min_{z_l} \frac{\beta}{2} f_{l+1}(z_l, x_{l+1}^{k-1})^\top f_{l+1}(z_l, x_{l+1}^{k-1}) - (\beta y_{l+1}^{k-1} + \lambda_{l+1}^{k-1})^\top f_{l+1}(z_l, x_{l+1}^{k-1}) + \qquad (6)$$

$$\frac{\rho}{2}\|B_l z_l + A_l y_l^{k-1} + v_l^k - b_l\|^2 + \mu_l^{k-1^\top} B_l z_l$$

$$\text{s.t. } \underline{z}_l \le z_l \le \bar{z}_l.$$

Here, the terms having $f_{l+1}(z_l, x_{l+1}^{k-1})$ are linearized and a proximal term is added:

$$\min_{z_l}(\beta f_{l+1}(z_l^{k-1}, x_{l+1}^{k-1})^\top \nabla f_{l+1}(z_l^{k-1}, x_{l+1}^{k-1}) - \qquad (7)$$

$$(\beta y_{l+1}^{k-1} + \lambda_{l+1}^{k-1})^\top \nabla f_{l+1}(z_l^{k-1}, x_{l+1}^{k-1}))z_l +$$

$$\frac{1}{2\eta_k}\|z_l - z_l^{k-1}\|_{M_l^k}^2 + \mu_l^{k-1^\top} B_l z_l + \frac{\rho}{2}\|B_l z_l + A_l y_l^{k-1} + v_l^k - b_l\|^2,$$

$$\text{s.t. } \underline{z}_l \le z_l \le \bar{z}_l,$$

Here, $M_l^k = \alpha I - \rho\eta_k B_l^T B_l \ge 1$ is selected to cancel the term $\|B_l z_l\|^2$, for example, $\alpha = \rho\eta_k\lambda_{max}(B_l^T B_l)$. The closed form solution of (7) is $P(\check{z}_l, \underline{z}_l, \bar{z}_l)$ where:

$$\check{z}_l = -\frac{\eta_k}{\alpha}((\beta\nabla f_{l+1}(z_l^{k-1}, x_{l+1}^{k-1})^\top f_{l+1}(z_l^{k-1}, x_{l+1}^{k-1}) - \qquad (8)$$

$$\nabla f_{l+1}(z_l^{k-1}, x_{l+1}^{k-1})^\top (\beta y_{l+1}^{k-1} + \lambda_{l+1}^{k-1})) +$$

$$B_l^\top(\mu_l^{k-1} + \rho(B_l z_l^{k-1} + A_l y_l^{k-1} + v_l^k - b_l)) + z_l^{k-1}.$$

Further yet, in block 530, the minimization yields $x_1^k, \ldots, x_L^k$. This step is also linearized similar to step 2 above:

$$\min_{x_1}((\beta f_1(x_1^{k-1}) - \beta y_1^{k-1} - \lambda_1^{k-1})^\top \nabla f_1(x_1^{k-1}))x_1 + \frac{1}{2\eta_k}\|x_1 - x_1^{k-1}\|^2, \qquad (9)$$

$$\text{s.t. } \underline{x}_1 \le x_1 \le \bar{x}_1.$$

This results in obtaining an updated $P(\check{x}_l, \underline{x}_l, \bar{x}_l)$, where $$\check{x}_l = x_l^{k-1} - \eta_k(\nabla f_1(x_1^{k-1})^T(\beta f_1(x_1^{k-1}) - \beta y_1^{k-1} - \lambda_1^{k-1})). \qquad (10)$$

For the next layers in the network $l = 2, \ldots, L$, the linearized sub problem is:

$$\min_{x_1}((\beta f_l(z_{l-1}^k, x_l^{k-1}) - \beta y_l^{k-1} - \lambda_l^{k-1})^\top \nabla f_l(z_{l-1}^k, x_l^{k-1}))x_l + \qquad (11)$$

$$\frac{1}{2\eta_k}\|x_l - x_l^{k-1}\|^2, \text{ s.t. } \underline{x}_l \le x_l \le \bar{x}_l.$$

The solution for this sub problem is $P(\check{x}_l, \underline{x}_l, \bar{x}_l)$, where $$\check{x}_l = x_l^{k-1} - \eta_k(\nabla f_l(z_{l-1}^k, x_l^{k-1})^T(\beta f_l(z_{l-1}^k, x_l^{k-1}) - \beta y_l^{k-1} - \lambda_l^{k-1})). \qquad (12)$$

In yet another minimization, in block 540, the $y_1^k, \ldots, y_L^k$ are obtained. The obtained values are then used to update the one or more multiplier values, at block 550. It should be noted that the various calculations are detailed in the flowchart and are not repeated herein. Accordingly, the control variables can be obtained for the single period optimization of the system 100 using this method.

Figure 6:
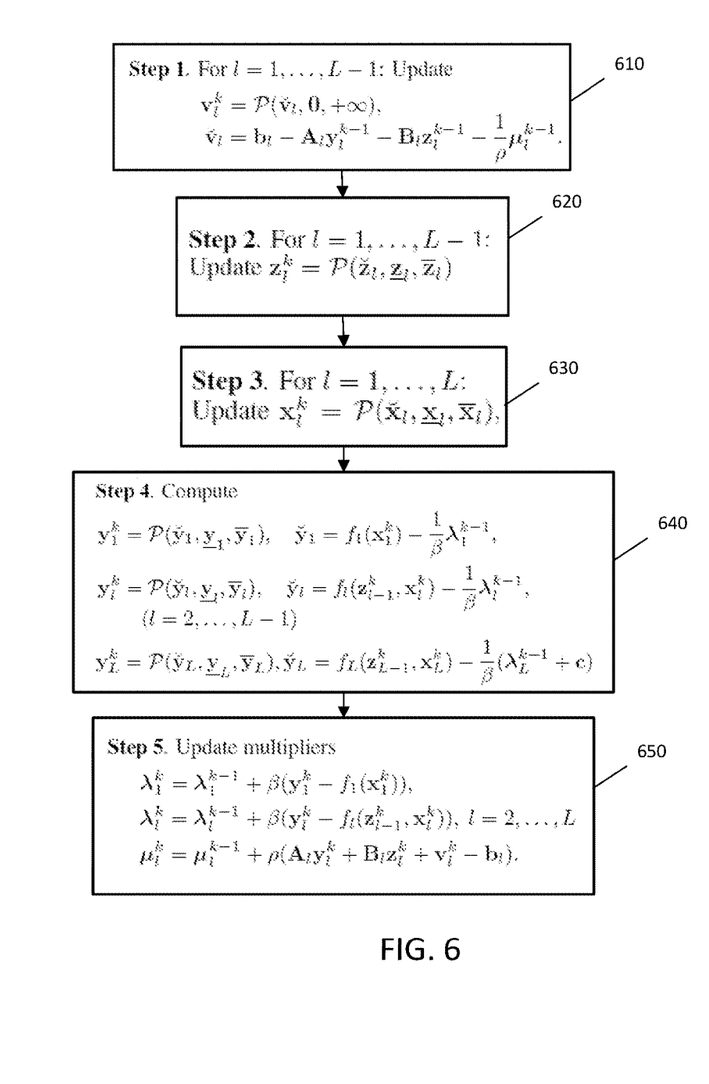
FIG. 6 depicts a flowchart for the method for implementing an optimization of the model of the entire system for a single time period according to one or more embodiments of the present invention.

FIG. 6 depicts a flowchart for the method for implementing an optimization of the model of the entire system for a single time period according to one or more embodiments of the present invention. The flowchart depicts the methods described above in a manner in which they are implemented in one or more embodiments of the present invention. For simplicity, the description herein is for a practical case of $\emptyset(y_l) = c^T(y_l)$, for a vector c. However, it is understood that the problem can be formulated in any other way and the one or more embodiments of the present invention would still be applicable. The method includes updating the v values, at block 610. These values are used to compute input parameters for an ANN. For example, the z values for each layer 1-(L-1) are computed using the v values, at block 620. The calculation of the z values is shown in Eq. (8). The ANN configured in this manner is used to compute the primary control variables x, at 630. The calculations for the x values is performed per Eq. (10) and Eq. (12). The control variables are then used to compute the output states y, at 640. The multiplier values are further updated based on the results of the present iteration, at 650. The updated multiplier values are used in the next iteration of the method. The method is continuously performed until output values y cannot be maximized any further.

Figure 7:
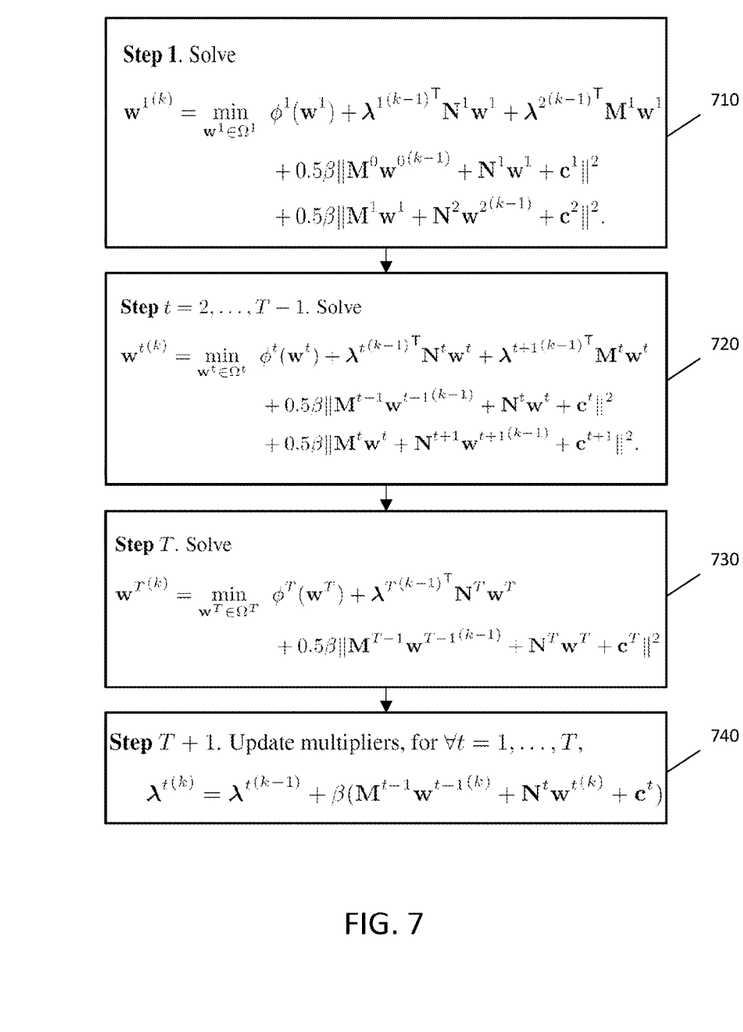
FIG. 7 depicts a flowchart of a method for implementing an optimization of the model of the entire system for multiple time periods according to one or more embodiments of the present invention.

FIG. 7 depicts a flowchart of a method for implementing an optimization of the model of the entire system for multiple time periods according to one or more embodiments of the present invention. For the multiple time periods, as described earlier, the formulation in Eq. (4) is decomposed by rewriting the coupling constraints (2) and (3) as:

$$(1-\rho)x_l^{t-1} - x_l^t + p_l^t = 0 - (1+\rho)x_l^{t-1} + x_l^t + q_l^t = 0 u_l^t = u_l^{t-1} + y_l^t - z_l^t(1-\alpha)u_l^{t-1} - u_l^t + r_l^t = 0 - (1+\alpha)u_l^{t-1} + u_l^t + s_l^t = 0. \qquad (13)$$

As a result, the problem from Eq. (4) can be represented in a compact form as:

$$\min_{w^1, \ldots, w^T} \sum_{t=1}^{T} \phi^t(w^t) \qquad (14)$$

$$\text{s.t. } w^t \in \Omega^t, t = 1, \ldots, T$$

$$M^{t-1}w^{t-1} + N^t w^t + c^t = 0,$$

where, $w = (X, u, p, q, r, s)$ and the constraint $\Omega^t$ is related to $X^t$, bounds for u, and positivity constraints for p, q, r, s. In this case, the Lagrangian can be defined as:

$$\mathcal{L}(w, \lambda, \beta) = \sum_{t=1}^{T} \phi^t(w^t) +$$

$$\sum_{t=1}^{T} \lambda^{t^\top}(M^{t-1}w^{t-1} + N^t w^t + c^t) + \frac{\beta}{2}\sum_{t=1}^{T}\|M^{t-1}w^{t-1} + N^t w^t + c^t\|^2.$$

Accordingly, referring to FIG. 7, the method for the multi-period optimization involves using the method described for a single period (FIGS. 5 and 6) to solve sub problems in the multi-period optimization problem. The method for the multi-period optimization includes solving the single period problem for the initial period represented by $w^t$, at block 710. Further, the method includes using the computed values for finding the control variables for the other time periods from $t=2$ to $T-1$, at block 720. The single period method is used or each of the time periods. The method further includes using the single period method for the last time period T, at block 730. It should be noted that the formulation of the optimization at the different time periods is different. Further yet, the multipliers are updated for the next iteration, if any, at block 740.

Referring to the method corresponding to the flowchart of FIG. 2, the interactions between the subsystems are now identified and the control variables determined. The method further includes optimizing and adjusting the machine learning models using derivative free optimization (DFO), at block 240. This is because the ensemble methods, such as Random Forests, act as a black box without derivative information available. Accordingly, the optimization is of a black-box function which leads to the issue of how to estimate the derivative information (with respect to input controls, not the parameters of the regression models) from the black box.

It should be noted, as described herein, that the objective functions of sub-problems in Steps 2 and 3 (FIG. 7) have been linearized. Therefore, unbiased estimators can be used in the method of FIG. 6 for $\nabla f_{l+1}(z_l, x_{l+1}^{k-1})$ at $z_l^{k-1}$, for $\nabla f_1(x_1)$ at $x_1^{k-1}$, and for $\nabla f_1(z_{l-1}^k, x_l)$ at $x_l^{k-1}$. This replacement results in similar workflow of the method as shown in FIG. 6, where the exact gradients for (8), (10) and (12) are now replaced by approximated gradients, where the gradient estimator at some x is computed as:

$$\nabla \hat{f}_i(x) = \frac{1}{b}\sum_{j=1}^{b}\frac{f_i(x - \delta w_j) - f_i(x)}{\delta}w_j,$$

Where, $w_j$ are random vectors, independently sampled from a standard normal distribution, b is the sample size, and δ is a predetermined positive value. Using an approximated gradient can introduce noise in the calculations. In order to address such a technical challenge, one or more embodiments of the present invention use a convolution operation with a Gaussian kernel, such as the following, to smooth out the computational noise:

$$F(x) := (f * \emptyset_\sigma)(x) = \int_{R^n} f(y)\emptyset_\sigma(y; x)dy$$

$$\text{where, } \emptyset_\sigma(y; x) := \frac{1}{\left(\sqrt{2\pi}\right)^n \sigma^n}\exp\left(-\frac{\|y - x\|^2}{2\sigma^2}\right)$$

Here, the error bounds are:

$$f(x) - \frac{nL\sigma^2}{2} \leq F(x) \leq f(x) + \frac{nL\sigma^2}{2}, \|\nabla f(x) - \nabla F(x)\| \leq \sqrt{n} L \sigma$$

The derivative can be estimated using Monte Carlo approximations and an adaptive importance sampling technique, that allows to reuse all sampled function values. Accordingly:

$$\nabla F(x) = \frac{1}{\sigma}\mathbb{E}[f(x + \sigma Z)Z], \tilde{G}^y(x) = \frac{1}{N}\sum_{i=1}^{N}\omega_\sigma(y_i; x)f(y_i),$$

$$\omega_\sigma(y_i; x) = \frac{\emptyset_\sigma(y_i; x)}{\psi(y_i)}$$

$$m_k(x_k + p) := b_k + g_k^T p + \frac{1}{2}p^T H_k p \approx F(x_k + p)$$

Further, a discussion is provided of applying the above described embodiments of the present invention to the oil sands production system 100 depicted in FIG. 1. The optimization for the system 100 includes generating prediction and site wide production optimization models to improve crude oil production under various asset capacity constraints and competing objectives. For example, the objective of the production optimization model is maximizing SCO production and maintaining the levels of intermediate products in the storage tanks T1-T4 (111-114) under both normal operations as well as during planned maintenance. Further, operational constraints can include an asset (e.g. plant P1 101) being under maintenance, hence reducing available production capacity. It is understood that other objective and/or constraints are possible in other examples, and the above are used for explanation herein.

In the event of process upsets or breakdowns within any plant (P1-P5), to ensure uninterrupted supply of diluted bitumen to upgrading and/or to the market, inventories of froth and diluted bitumen are maintained in the storage tanks (T1-T4). Depending on operational constraints, planned maintenance schedules, and production plans, plant managers balance the production of SCO through the various unit processes to maximize the output and to maintain enough inventories of intermediate products. Regression models are used to represent the relationships between inflows and outflows for each plant Pi. These models are built using deep fully connected neural networks in one or more embodiments of the present invention.

Data analysis can reveal that transient changes in the covariates happen much faster (between 15-20 minutes) than the time scale of process optimization, which was an hourly model. So, a static prediction model to estimate behaviors of continuous flow processes can be considered at an hourly granularity. For each regression model, the time-series data is aggregated at an hourly granularity using the mean of 12 data points (collected at a 5-minute granularity). In other embodiments, any other granularity can be used and any other number of data points can be collected.

Based on expert input and feature extraction and engineering, covariates to be used for each regression model are identified. The dataset is ordered by time and then split into train, test and validation sets. Each split is time-wise contiguous, i.e. it contains data for set of consecutive time stamps.

In this example scenario a single period optimization is to be performed when a plant manager has to configure the system 100 for the next hour. For multi-period optimization, the case is where the plant manager has to provide decisions at each hour for next 10 hours, or some other duration and/or intervals. Note that the prediction functions can be different for each period; and the multi-period also uses coupling constraints, which in this case are control action constraints and inventory capacity constraints. For example, the constraints can be α=30% and ρ=30%, that is, the limitation percentages of the changes between two consecutive periods.

Figure 8:
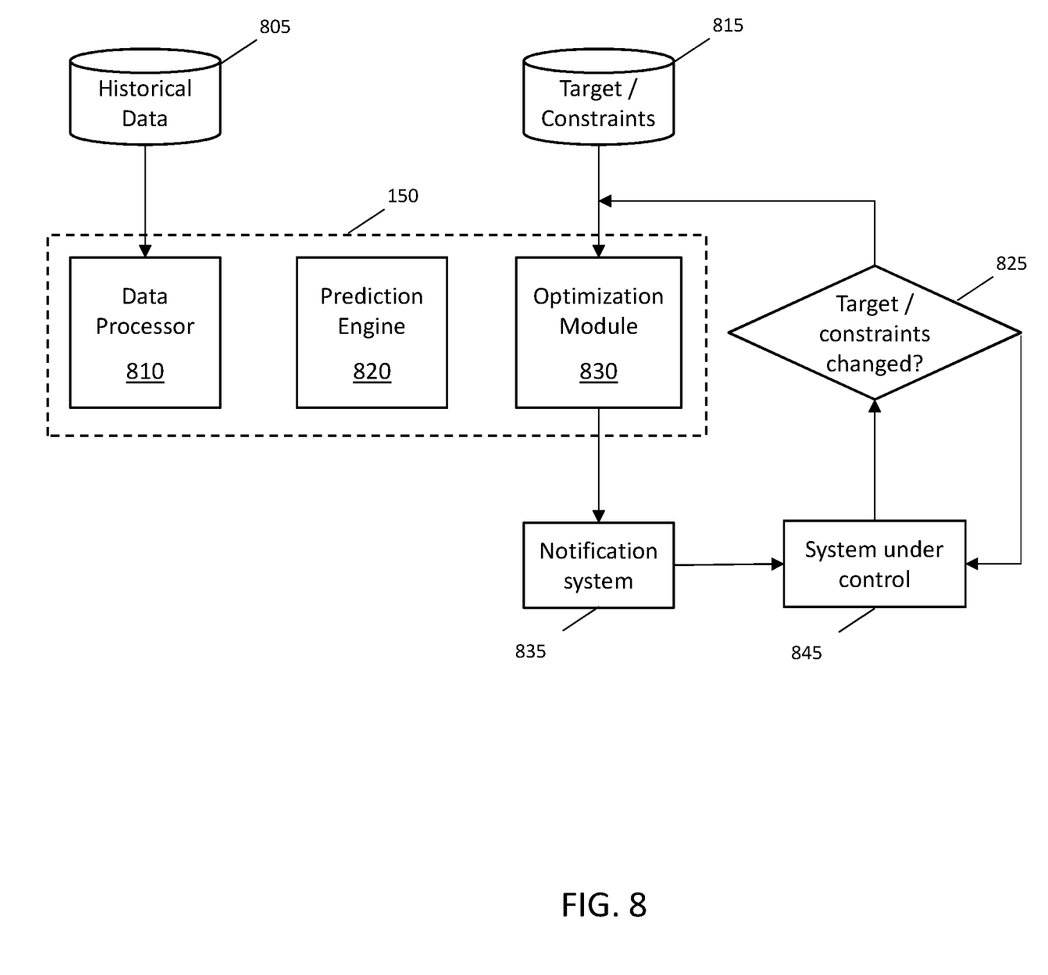
FIG. 8 depicts an operation flow/block diagram for using machine learning to identify control variable values for a system according to one or more embodiments of the present invention.

FIG. 8 depicts an operation flow/block diagram for using machine learning to identify control variable values for a system according to one or more embodiments of the present invention. The controller 150 receives the historical data 805 of the system 100. The controller 150 can include a data processor 810 that analyzes the received historical data 805. For example, the data processor 810 can parse the historical data 805 and extract the inputs, outputs, control variables, constraints and other such operational parameters of the system 100 for the duration over which the historical data 805 is captured.

The controller 150 can include a prediction engine 820 that uses the extracted data from the data processor 810 to generate regression models of each subsystem in the system 100. The prediction engine 820 further determines relationships between the subsystems. The prediction engine 820 is used to generate one or more control variables for each of the subsystems. As noted earlier, the subsystems can be the plants P1-P5, and/or the storage tanks T1-T4. The control variables can include the primary and/or the secondary control variables for the subsystems. The prediction engine 820 generates the control variables based on the regression models for each subsystem. The control variables generated can be optimal for each of the respective subsystem.

Further, the controller 150 includes an optimization module 830 that optimizes the control variables that are generated by the prediction engine 820. The optimization module 830 uses machine learning, such as a DNN to optimize the control variables. The optimization module 830 receives constraints under which the one or more subsystems are to be operated. The constraints can includes limits on amounts of input, amounts of storage, operation time, and other such parameters. The optimization module 830 further receives sensor data. The optimization module 830 further receives target intervals 815 for which the control variables are to be optimized. For example, the target 815 can indicate if a single period optimization is to be performed or a multi-period optimization is to be performed for a longer duration.

The controller 150 notifies the plant manager of the optimized control variables. In one or more examples, the notification can be performed by a notification system 835. The notification system 835 can notify the plant manager via electronic messages, such as email, text messages, instant messages, and the like. The notification can also be provided via a user interface, such as an audio/visual interface. The controller 150 can also adjust the control variables of the one or more plants to the optimized control variables.

The system 100 continues to operate with the adjusted control variables, as shown at block 845. If targets and/or constraints change, the optimization module 830 generates updated optimized control variables and adjusts the system 100 accordingly, as shown at block 825. If the targets and constraints do not change, the system continues to operate with the set control variables, as shown at block 845.

One or more embodiments of the present invention facilitate managing operations of a production plant using optimization to determine optimal control set-points for all control variables across multiple subsystems of the plant. Managing the operations includes using advanced machine learning/deep learning models that can capture complex nonlinear relationships between the subsystems. A data driven model can explicitly learn dynamics and non-stationary behaviors. In one or more embodiments of the present invention a model selection step is used to choose the best fit model.

According to one or more embodiments of the present invention, a multi-time period set-point optimization model offers the flexibility of incorporating operational constraints (i.e., asset capacity constraints) and user specified production restrictions (i.e., expected production interruptions) for site-wide operations. For this, the model is represented as an optimization problem in a directed acyclic graph.

According to one or more embodiments of the present invention, the flexible optimization approaches that can take in regression functions without derivative information such as random forests, and those with derivatives such as neural networks are used. Described herein are at least two nonlinear optimization techniques for solving gradient-based and derivative-free models. The optimization techniques facilitate providing set-point recommendations in near real-time.

One or more embodiments of the present invention facilitate an approach to recasting of a multi-plant process network into a surrogate network of regression transformers that capture the process input to output relationships in a data-driven manner, instead of relying on state-of-the art process simulators or first-principles based approaches to estimate these relationships. Coupling this representation with operational constraints facilitates one or more embodiments of the present invention to develop a prediction optimization formulation for data-driven, site-wide optimization. Further, one or more embodiments of the present invention use nonlinear regression functions to represent the behavior of the various unit processes under varying set points, parameter values, and operational conditions. The multiple non-linear behavioral models are tied together in a non-linear set-point optimization model that can consume operational and practical considerations as side constraints. Further, one or more embodiments of the present invention facilitate improvements to primal-dual methods to solve such a model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source-code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for controlling a production system, the computer-implemented method comprising:
    mapping, by a controller, the production system as a directed acyclic graph, the production system comprising a plurality of plants that are represented as nodes and relations between the plants represented by edges of the directed acyclic graph;
    generating, by the controller, a regression model for each of the plants in the production system, wherein a first regression model for a first plant of the plurality of plants comprises a gradient-based model and wherein a second regression model for a second plant of the plurality of plants comprises a black-box model;
    predicting, by the controller, an output of each plant based on sensor data and the regression model associated from each respective plant;
    determining, by the controller, one or more optimized control variables for each plant based on the regression models and a target output by using machine learning, wherein the one or more optimized control variables are selected to maximize the target output, wherein the optimized control variables for the first regression model are determined by decomposing the gradient-based model using a primal dual algorithm, and wherein the optimized control variables for the second regression model are determined using a derivative free optimization and estimating noisy gradients by convolution smoothing;
    adjusting, by the controller, one or more set points for each plant based on the optimized control variables to generate the target output, wherein each of the one or more optimized control variables is associated with a set point; and
    operating the production system using the adjusted one or more set points.

2. The computer-implemented method of claim 1, further comprising sending, by the controller, a notification with the optimized one or more control variables.

3. The computer-implemented method of claim 1, wherein adjusting the one or more set points comprises determining, by the controller, one or more non-linear relations between the plants based on the sensor data.

4. The computer-implemented method of claim 1, wherein the target output is a multi-period set point comprising a plurality of desired outputs over a predetermined duration.

5. The computer-implemented method of claim 4, wherein each period in the multi-period set point has respective constraints.

6. A system comprising:
a plurality of plants that form a production system; and
a controller coupled with the plurality of plants for controlling the production system by performing a method comprising:
mapping the production system as a directed acyclic graph, the plurality of plants are represented by nodes and relations between the plants represented by edges of the directed acyclic graph;
generating a regression model for each of the plants in the production system, wherein a first regression model for a first plant of the plurality of plants comprises a gradient-based model and wherein a second regression model for a second plant of the plurality of plants comprises a black-box model;
predicting an output of each plant based on sensor data and the regression model associated from each respective plant;
determining one or more optimized control variables for each plant based on the regression models and a target output by using machine learning, wherein the one or more optimized control variables are selected to maximize the target output, wherein the optimized control variables for the first regression model are determined by decomposing the gradient-based model using a primal dual algorithm, and wherein the optimized control variables for the second regression model are determined using a derivative free optimization and estimating noisy gradients by convolution smoothing;
adjusting one or more set points for each plant based on the optimized control variables to generate the target output, wherein each of the one or more optimized control variables is associated with a set point; and
operating the production system using the adjusted one or more set points.

7. The system of claim 6, wherein the method further comprises sending, by the controller, a notification with the optimized one or more control variables.

8. The system of claim 6, wherein adjusting the one or more set points comprises determining, by the controller, one or more non-linear relations between the plants based on the sensor data.

9. The system of claim 6, wherein the target output is a multi-period set point comprising a plurality of desired outputs over a predetermined duration.

10. The system of claim 9, wherein each period in the multi-period set point has respective constraints.

11. A computer program product comprising a computer readable storage medium that has computer executable instructions stored thereupon, the computer executable instructions when executed by a processor cause the processor to perform a method comprising:
mapping, by a controller, a production system as a directed acyclic graph, the production system comprising a plurality of plants that are represented as nodes and relations between the plants represented by edges of the directed acyclic graph;
generating, by the controller, a regression model for each of the plants in the production system, wherein a first regression model for a first plant of the plurality of plants comprises a gradient-based model and wherein a second regression model for a second plant of the plurality of plants comprises a black-box model;
predicting, by the controller, an output of each plant based on sensor data and the regression model associated from each respective plant;
determining, by the controller, one or more optimized control variables for each plant based on the regression models and a target output by using machine learning, wherein the one or more optimized control variables are selected to maximize the target output, wherein the optimized control variables for the first regression model are determined by decomposing the gradient-based model using a primal dual algorithm, and wherein the optimized control variables for the second regression model are determined using a derivative free optimization and estimating noisy gradients by convolution smoothing;
adjusting, by the controller, one or more set points for each plant based on the optimized control variables to generate the target output, wherein each of the one or more optimized control variables is associated with a set point; and
operating the production system using the adjusted one or more set points.

12. The computer program product of claim 11, wherein adjusting the one or more set points comprises determining, by the controller, one or more non-linear relations between the plants based on the sensor data.

13. The computer program product of claim 11, wherein the target output is a multi-period set point comprising a plurality of desired outputs over a predetermined duration.

14. The computer program product of claim 13, wherein each period in the multi-period set point has respective constraints.

* * * * *